US011975356B2

United States Patent

(12) United States Patent
Yamamoto et al.

(10) Patent No.: US 11,975,356 B2
(45) Date of Patent: May 7, 2024

(54) RESIN CURING DEVICE AND RESIN CURING METHOD

(71) Applicant: Honda Motor Co., Ltd., Tokyo (JP)

(72) Inventors: Naoki Yamamoto, Tochigi (JP); Nobuhisa Takahashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 367 days.

(21) Appl. No.: 17/196,961

(22) Filed: Mar. 9, 2021

(65) Prior Publication Data

US 2021/0291221 A1 Sep. 23, 2021

(30) Foreign Application Priority Data

Mar. 18, 2020 (JP) ................................ 2020-047676

(51) Int. Cl.

| | |
|---|---|
| ***B05D 3/04*** | (2006.01) |
| ***B05C 9/14*** | (2006.01) |
| ***F27B 17/00*** | (2006.01) |
| ***F27D 7/02*** | (2006.01) |
| ***F27D 7/04*** | (2006.01) |
| *B05D 3/02* | (2006.01) |
| *F27D 19/00* | (2006.01) |

(52) U.S. Cl.

CPC .............. *B05D 3/0413* (2013.01); *B05C 9/14* (2013.01); *F27B 17/0083* (2013.01); *F27D 7/02* (2013.01); *F27D 7/04* (2013.01); *B05D 3/0272* (2013.01); *F27D 2007/023* (2013.01); *F27D 2007/045* (2013.01); *F27D 2019/0012* (2013.01)

(58) Field of Classification Search

CPC ...... B05C 9/14; B05D 3/0272; B05D 3/0413; F27B 17/0083; F27D 7/02; F27D 7/04; F27D 2007/023; F27D 2007/045; F27D 2019/0012

USPC ........................................................ 432/221

See application file for complete search history.

(56) References Cited

U.S. PATENT DOCUMENTS

| | | | | |
|---|---|---|---|---|
| 3,039,140 A * | 6/1962 | Andrews | B29C 33/36 156/381 |
| 2019/0160529 A1* | 5/2019 | Silidker | G05D 23/00 |

FOREIGN PATENT DOCUMENTS

| | | |
|---|---|---|
| CN | 102350793 A * | 2/2012 |
| CN | 102906522 | 1/2013 |
| CN | 103752482 | 4/2014 |
| CN | 209310455 | 8/2019 |
| CN | 110296545 | 10/2019 |
| GB | 1215657 | 12/1970 |

(Continued)

OTHER PUBLICATIONS

CN 102350793 A—Translation (Year: 2012).*

(Continued)

*Primary Examiner* — Steven B McAllister
*Assistant Examiner* — Benjamin W Johnson
(74) *Attorney, Agent, or Firm* — JCIPRNET

(57) ABSTRACT

Provided is a resin curing device capable of improving work efficiency when curing a liquid resin. A controller (2) of a resin curing device (1) controls opening degrees of three valves (51 to 53) so that a gas flow passage becomes a circulation passage (40) when an execution condition of an operation of feeding air to a curing furnace (10) is satisfied, and controls the opening degrees of the three valves (51 to 53) so that the gas flow passage becomes a bypass passage (41) when the execution condition is not satisfied (STEPS 30 to 41).

5 Claims, 10 Drawing Sheets

(56) References Cited

FOREIGN PATENT DOCUMENTS

| | | | |
|---|---|---|---|
| JP | H0270769 | | 5/1990 |
| JP | H07265631 | | 10/1995 |
| JP | H10256284 | | 9/1998 |
| JP | 2005110493 | | 4/2005 |
| JP | 2005118632 A | * | 5/2005 |
| JP | 2012110810 | | 6/2012 |

OTHER PUBLICATIONS

JP 2005118632 A—Translation (Year: 2005).*
"Office Action of Japan Counterpart Application" with English translation thereof, dated Oct. 19, 2021, p. 1-p. 6.
"Office Action of China Counterpart Application" with English translation thereof, dated May 18, 2022, p. 1-p. 12.

* cited by examiner

RESIN CURING DEVICE AND RESIN CURING METHOD

CROSS-REFERENCE TO RELATED APPLICATIONS

This application claims the priority benefit of Japanese Patent Application No. 2020-047676, filed on Mar. 18, 2020. The entirety of the above-mentioned patent application is hereby incorporated by reference herein and made a part of this specification.

BACKGROUND

Technical Field

The disclosure relates to a resin curing device for curing a liquid resin attached to an object in a predetermined curing temperature atmosphere.

Related Art

Conventionally, as a resin curing device, the resin curing device described in Japanese Patent Application Laid-open No. 2005-110493(Patent Document 1) is known. The resin curing device shown in FIG. 5 of Patent Document 1 applies a varnish being a liquid resin to a winding coil and cures it by a batch processing method, and includes a curing furnace, a heater, and the like. In this resin curing device, the winding coil is accommodated in the curing furnace after the varnish is applied to the winding coil. The air heated by the heater is then supplied to the winding coil to cure the varnish.

According to the conventional resin curing device described above, due to the batch processing method, it is necessary to stop the heater after the varnish of the winding coil is cured, remove the winding coil from the curing furnace, and then accommodate the next winding coil in the curing furnace. During the working, the heated air escapes from the curing furnace, leading to a decrease in the temperature inside the curing furnace and the temperature of the heater. As a result, when curing the varnish of the next winding coil, it takes time to raise the temperature in the curing furnace to a temperature suitable for curing the varnish again, which leads to a deterioration of work efficiency.

In addition, if the varnish vaporized in the curing furnace is liquefied as the temperature inside the furnace decreases and then the temperature inside the furnace is raised again, the varnish attached to the heater or fan may be cured. In that case, it is necessary to remove the cured varnish or replace the parts, which requires time and thus further reduces the work efficiency. The above problem also occurs when curing a liquid resin other than varnish.

SUMMARY

The disclosure provides a resin curing device capable of improving work efficiency when curing a liquid resin.

According to a first aspect of the disclosure, there is provided a resin curing device for curing a liquid resin attached to an object (workpiece) in a predetermined curing temperature atmosphere. The resin curing device 1 includes: a heater for heating gas; a curing furnace that allows the object (workpiece) to be taken in and out via an opening; a blower for blowing gas; a circulation passage extending among the blower, the heater, and the curing furnace so as to allow the gas to circulate among the blower, the heater, and the curing furnace; a bypass passage connected to the circulation passage so as to bypass the curing furnace; a flow passage switching device (a first circulation passage valve, a second circulation passage valve, and a bypass valve) capable of switching the gas flow passage between the circulation passage and the bypass passage; and a flow passage control device (a controller) that controls the flow passage switching device so that the gas flow passage becomes the circulation passage when an execution condition of an operation of feeding the gas to the curing furnace is satisfied, and controls the flow passage switching device so that the gas flow passage becomes the bypass passage when the execution condition is not satisfied.

According to this resin curing device, when the execution condition of the operation of feeding the gas to the curing furnace is satisfied, the flow passage switching device is controlled so that the gas flow passage becomes the circulation passage. Therefore, when the execution condition is satisfied, the gas heated by the heater can be circulated among the blower, the heater and the curing furnace by the blower, and the liquid resin attached to the object can be appropriately cured.

On the other hand, when the execution condition is not satisfied, the flow passage switching device is controlled so that the gas flow passage becomes the bypass passage. Therefore, for example, when the object is taken out of the curing furnace and the next object is accommodated in the curing furnace, the gas heated by the heater can be circulated between the blower and the heater by the blower without being circulated to the curing furnace side.

Accordingly, unlike before, it is not necessary to lower the temperature of the heater until the next object is accommodated in the curing furnace, and the gas heated by the heater can be quickly fed into the curing furnace when the gas flow passage is switched from the bypass passage to the circulation passage. As a result, the time required to raise the temperature in the curing furnace to an appropriate temperature again can be shortened as compared with before, and the work efficiency during curing of the liquid resin can be improved. In addition, unlike before, the decrease in the temperature of the heater and the temperature of the gas can be prevented, and thus the vaporized varnish can be prevented from liquefying and attaching to the heater and the fan, and the removal of the cured varnish or replacement of the parts becomes unnecessary. Accordingly, the work efficiency can be further improved (moreover, "the condition is satisfied" in the present specification means that the condition is satisfied and a predetermined state is satisfied).

According to a second aspect of the disclosure, the resin curing device further includes a first temperature sensor for detecting a first temperature being the temperature inside the curing furnace, a second temperature sensor for detecting a second temperature being the temperature inside the circulation passage on the downstream side of the heater and in the vicinity of the heater, and a heater control device (controller) that controls the heater based on the first temperature when the gas flow passage is the circulation passage, and controls the heater based on the second temperature when the gas flow passage is the bypass passage.

According to this resin curing device, when the gas flow passage is the circulation passage, the heater is controlled based on the first temperature in the curing furnace, and the gas heated by the heater is circulated among the blower, the heater and the curing furnace by the blower. Therefore, when the object to which the liquid resin is attached is accommodated in the curing furnace, the liquid resin can be appropriately cured.

In addition, when the gas flow passage is the bypass passage, the heater is controlled based on the second temperature, and the gas heated by the heater is circulated between the blower and the heater by the blower. Accordingly, the temperature of the heater and the temperature of the gas can be maintained at appropriate values between the time when the object is taken out from the curing furnace and the time when the next object is accommodated in the curing furnace. As a result, the gas having the above temperature can be quickly fed into the curing furnace when the gas flow passage is switched from the bypass passage to the circulation passage. In addition to this, when the gas is circulated between the blower and the heater via a part of the circulation passage and the bypass passage, the temperature of the gas can be prevented from exceeding a heat resistant temperature of the circulation passage and the bypass passage, and the service life of a part of the circulation passage and the bypass passage can be extended.

According to a third aspect of the disclosure, there is provided a resin curing device, when the gas flow passage is the circulation passage, the heater control device controls the heater based on the second temperature when the second temperature is lower than a predetermined temperature, and controls the heater based on the first temperature after a predetermined condition including that the second temperature has reached the predetermined temperature is satisfied.

According to this resin curing device, when the gas flow passage is the circulation passage, it takes time for the gas heated by the heater to reach the curing furnace via the circulation passage. Therefore, when the heater is controlled based on the first temperature under a condition that the temperature of the gas in the circulation passage is low, the temperature of the gas on the downstream side of the heater and in the vicinity of the heater, that is, the second temperature may exceed the heat resistant temperature of the circulation passage.

In contrast, according to this resin curing device, when the second temperature is lower than the predetermined temperature, the heater is controlled based on the second temperature. Therefore, by appropriately setting the predetermined temperature, the second temperature can be prevented from exceeding the heat resistant temperature of the circulation passage, and the service life of the circulation passage can be extended. Furthermore, the heater is controlled based on the first temperature after the predetermined condition including that the second temperature has reached the second predetermined temperature is satisfied, and therefore the temperature in the curing furnace can be controlled to an optimum temperature for curing the liquid resin.

According to a fourth aspect of the disclosure, the resin curing device further includes an opening/closing device (a shutter) for opening/closing the opening of the curing furnace. The flow passage control device (controller) includes an object determination unit for determining whether the object (workpiece) is accommodated in the curing furnace or not, and an execution condition determination unit that determines that the execution condition is satisfied when the following condition is satisfied: the object determination unit determines that the object (workpiece) is accommodated in the curing furnace, and the opening of the curing furnace is closed by the opening/closing device.

According to this resin curing device, when the following condition is satisfied: the object determination unit determines that the object is accommodated in the curing furnace, and the opening of the curing furnace is closed by the opening/closing device, the flow passage switching device is controlled so that the gas flow passage becomes the circulation passage, and the liquid resin attached to the object can thus be appropriately cured. On the other hand, when the object is not accommodated in the curing furnace or the opening of the curing furnace is opened, the flow passage switching device is controlled so that the gas flow passage becomes the bypass passage. Accordingly, as described above, it is not necessary to lower the temperature of the heater until the next object is accommodated in the curing furnace, and the gas heated by the heater can be quickly fed into the curing furnace when the gas flow passage is switched from the bypass passage to the circulation passage.

According to a fifth aspect of the disclosure, there is provided a resin curing method in which an object (workpiece) is accommodated in a curing furnace and a liquid resin attached to an object (workpiece) is cured in a predetermined curing temperature atmosphere. In this resin curing method, when the object (workpiece) is accommodated in the curing furnace, gas heated by a heater is circulated among the heater, a blower, and the curing furnace via a circulation passage extending among the heater, the blower, and the curing furnace, and when the object (workpiece) is taken out from the curing furnace, the gas flow passage is switched from the circulation passage to a bypass passage that bypasses the curing furnace by a flow passage switching device (a first circulation passage valve, a second circulation passage valve, and a bypass valve).

According to a sixth aspect of the disclosure, there is provided a resin curing method in which an object (workpiece) is accommodated in a curing furnace and a liquid resin attached to an object (workpiece) is cured in a predetermined curing temperature atmosphere. In this resin curing method, gas is heated by a heater, and the gas heated by the heater is circulated among the heater, a blower, and the curing furnace via a circulation passage extending among the heater, the blower, and the curing furnace, a first temperature being the temperature inside the curing furnace is detected, a second temperature being the temperature inside the circulation passage on the downstream side of the heater and in the vicinity of the heater is detected, and the heater is controlled based on the second temperature when the second temperature is lower than a predetermined temperature, and is controlled based on the first temperature after a predetermined condition including that the second temperature has reached the predetermined temperature is satisfied.

DESCRIPTION OF THE EMBODIMENTS

Hereinafter, a resin curing device 1 according to an embodiment of the disclosure is described with reference to FIG. 1 and FIG. 2. The resin curing device 1 of the present embodiment is used for curing a liquid resin applied to a workpiece W (object), and in the present embodiment, a coil assembly of a motor (not shown) is used as the workpiece W, and varnish (not shown) is used as the liquid resin.

Figure 1:
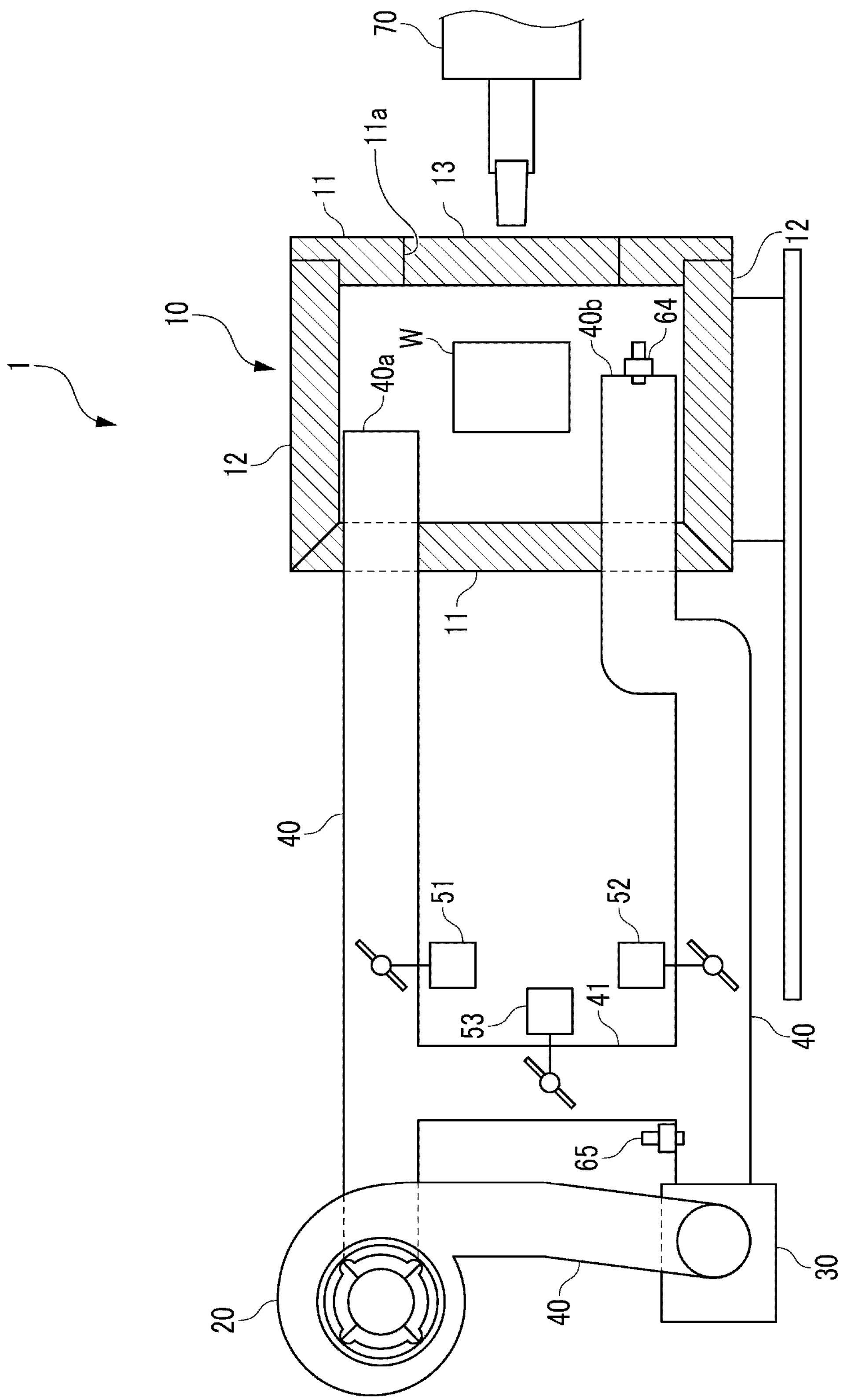
FIG. 1 is a diagram schematically showing a configuration of a resin curing device according to an embodiment of the disclosure.
Figure 2:
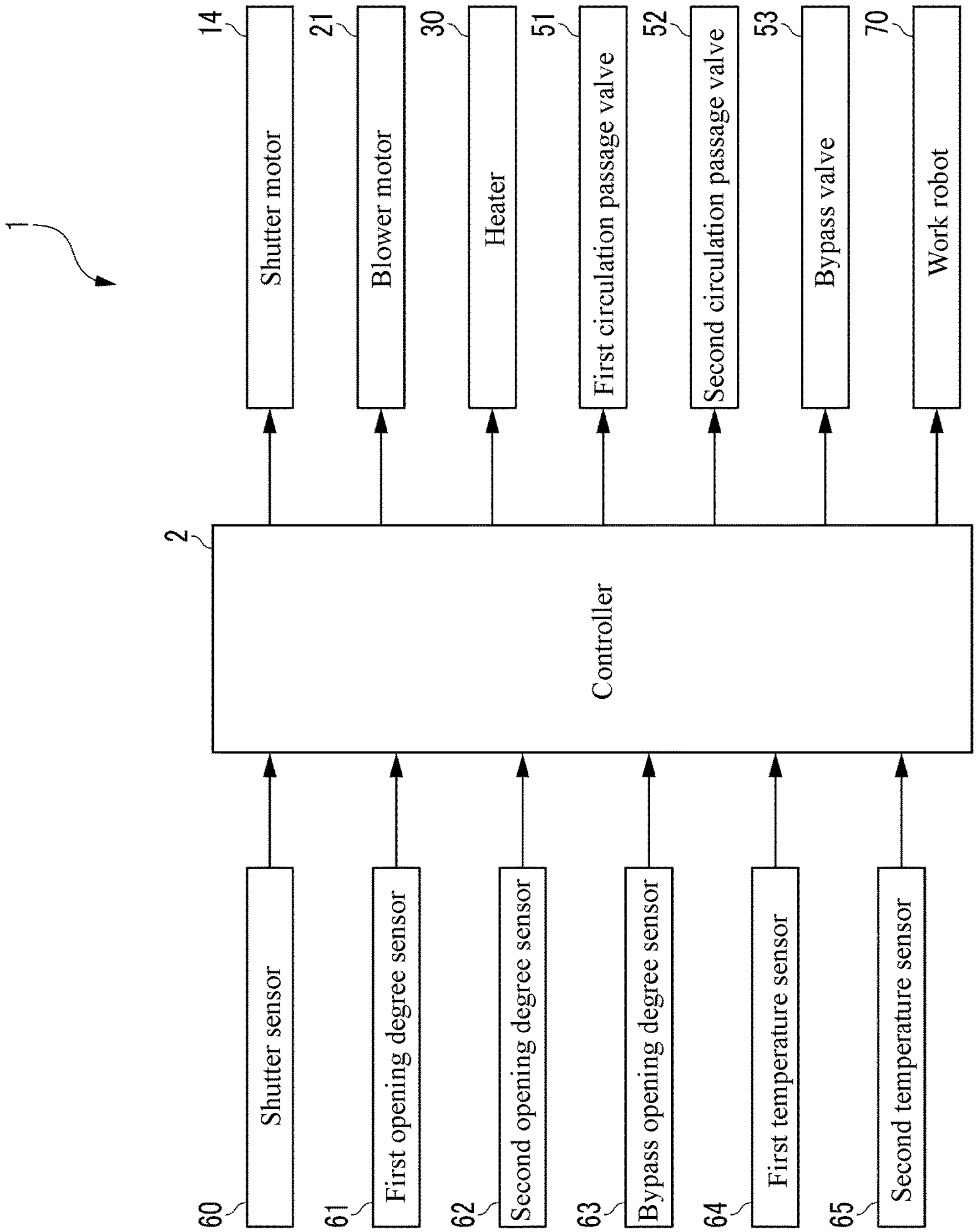
FIG. 2 is a block diagram showing an electrical configuration of the resin curing device.

As shown in FIG. 1, the resin curing device 1 includes a curing furnace 10, a blower 20, a heater 30, a circulation passage 40, and the like. Moreover, in the following description, for the sake of convenience, the left side of FIG. 1 is referred to as "front side", the right side of FIG. 1 is referred to as "rear side", the inner side of FIG. 1 is referred to as "right side", and the front side of FIG. 1 is referred to as "left side".

The circulation passage 40 is constituted of a circular tubular duct and extends between the curing furnace 10, the blower 20, and the heater 30. The duct has a performance of a predetermined heat resistant temperature Tmax.

Moreover, in the following description, for the sake of convenience, the circulation passage 40 extending between the curing furnace 10 and the blower 20 is referred to as an "upstream circulation passage 40", the circulation passage 40 extending between the blower 20 and the heater 30 is referred to as an "intermediate circulation passage 40", and the circulation passage 40 extending between the heater 30 and the curing furnace 10 is referred to as a "downstream circulation passage 40".

The distal end portion of the upstream circulation passage 40 on the curing furnace 10 side is opened in the curing furnace 10, and this opening is an air suction port In addition, the distal end portion of the downstream circulation passage 40 on the curing furnace 10 side is also opened in the curing furnace 10, and this opening is an air outlet port 40*b*.

Furthermore, a bypass passage 41 extends between the upstream circulation passage 40 and the downstream circulation passage 40, and is used for flowing air while bypassing the curing furnace 10. One end portion of the bypass passage 41 is connected slightly closer to a portion on the curing furnace 10 side than the blower 20 on the upstream circulation passage 40, and the other end portion of the bypass passage 41 is connected slightly closer to a portion on the curing furnace 10 side than the heater 30 on the downstream circulation passage 40.

On the other hand, the curing furnace 10 is arranged on a floor surface (not shown). The curing furnace 10 includes a front wall 11, a rear wall 11, a left wall (not shown), a right wall (not shown), an upper wall 12 and a lower wall 12, and is formed into a rectangular box shape by the walls 11 to 12. All of the walls 11 to 12 are made of heat-resistant members.

An opening 11*a* is formed on the rear wall 11 of the curing furnace 10, and the workpiece W is taken in and out of the curing furnace 10 through the opening 11*a*. A support portion (not shown) is arranged on the curing furnace 10, and the workpiece W is supported by the support portion when accommodated in the curing furnace 10 through the opening 11*a*.

Furthermore, a shutter 13 (an opening/closing device) is arranged on the rear wall 11 of the curing furnace 10, and the opening 11*a* is opened/closed by sliding the shutter 13 in the left-right direction. The shutter 13 is an electric shutter and includes a shutter motor 14 (see FIG. 2) and a gear mechanism (not shown). The shutter 13 is driven in the left-right direction by the shutter motor 14, thereby opening/closing the opening 11*a*.

The shutter motor 14 is electrically connected to a controller 2. In shutter control processing described later, the operating state of the shutter motor 14 is controlled by the controller 2, and thereby the shutter 13 is driven between a closed position where the opening 11*a* is closed and an open position where the opening 11*a* is opened.

Furthermore, a shutter sensor 60 is arranged on the shutter motor 14. The shutter sensor 60 is a resolver type sensor that detects the rotation angle of the shutter motor 14 and outputs a detection signal representing the rotation angle to the controller 2. The controller 2 determines the open/closed state of the shutter 13 based on the detection signal of the shutter sensor 60.

On the other hand, the blower 20 is a turbofan blower and is configured to suck air from the upstream circulation passage 40 and then discharge the air to the intermediate circulation passage 40 during operation. The blower 20 includes a blower motor 21, and the blower motor 21 is electrically connected to the controller 2. The blower motor 21 is constantly driven by the controller 2 during the operation of the resin curing device 1, and the blower 20 is constantly operated accordingly.

The heater 30 is used for heating the air passing through the heater 30 and includes a heater element (not shown). The heater 30 is electrically connected to the controller 2 and generates heat by the supply of electric power from the controller 2 to the heater element. During the execution of heater control processing described later, the heat generation state of the heater element in the heater 30 is controlled by the controller 2. That is, the heater 30 is controlled.

In addition, a first circulation passage valve 51 is arranged slightly closer to a portion on the curing furnace 10 side than the connection portion between the upstream circulation passage 40 and the bypass passage 41. The first circulation passage valve 51 is an electric butterfly valve, and its opening degree can be changed between a fully closed value and a fully open value. When the opening degree of the first circulation passage valve 51 is the fully closed value, the inside of the upstream circulation passage 40 is completely closed and kept in a state in which air does not flow.

On the other hand, when the opening degree of the first circulation passage valve 51 is the fully open value, the inside of the upstream circulation passage 40 is completely opened, and the air flows smoothly. The first circulation passage valve 51 is electrically connected to the controller 2, and the opening degree is controlled by the controller 2 during the operation of the resin curing device 1.

In addition, the first circulation passage valve 51 is provided with a first opening degree sensor 61. The first opening degree sensor 61 is constituted of, for example, a potentiometer. The first opening degree sensor 61 is electrically connected to the controller 2, detects the opening degree of the first circulation passage valve 51, and outputs a detection signal representing the opening degree to the controller 2.

Furthermore, a second circulation valve 52 is arranged slightly closer to a portion on the curing furnace 10 side than the connection portion between the downstream circulation passage 40 and the bypass passage 41. The second circulation passage valve 52 has the same configuration as the first circulation passage valve 51, and the opening degree is controlled by the controller 2 during the operation of the resin curing device 1.

Besides, the second circulation passage valve 52 is provided with a second opening degree sensor 62. The second opening degree sensor 62 is configured in the same manner as the first opening degree sensor 61. The second opening degree sensor 62 is electrically connected to the controller 2, detects the opening degree of the second circulation passage valve 52, and outputs a detection signal representing the opening degree to the controller 2.

On the other hand, a bypass valve 53 is arranged in the middle of the bypass passage 41. The bypass valve 53 is configured in the same manner as the first circulation passage valve 51 and the second circulation passage valve 52, and the opening degree is controlled by the controller 2 during the execution of resin curing control processing described later. Moreover, in the present embodiment, the first circulation passage valve 51, the second circulation passage valve 52, and the bypass valve 53 correspond to a flow passage switching device.

In addition, the bypass valve 53 is provided with a bypass opening degree sensor 63. The bypass opening degree sensor 63 is configured in the same manner as the first opening sensor 61 and the second opening sensor 62. The bypass opening degree sensor 63 is electrically connected to the controller 2, detects the opening degree of the bypass valve 53 and outputs a detection signal representing the opening degree to the controller 2.

With the above configuration, in the resin curing device 1, by controlling the opening degrees of the three valves 51 to 53 by the controller 2, the gas flow passage is switched between the circulation passage 40 and the bypass passage 41 during the execution of the resin curing control processing described later. At that time, when the gas flow passage is set to the circulation passage 40 by the flow passage control processing described later, the air discharged from the blower 20 flows through the heater and the curing furnace 10 via the circulation passage 40, and then is sucked into the blower 20. Consequently, the air circulates between the blower 20, the heater 30, and the curing furnace 10 via the circulation passage 40 (see FIG. 7).

On the other hand, when the gas flow passage is set to the bypass passage 41, the air discharged from the blower 20 reaches the heater 30 via the intermediate circulation passage 40, passes through the heater 30, and then is sucked into the blower via the bypass passage 41 and a part of the upstream circulation passage 40. Consequently, the air circulates between the blower 20 and the heater 30 via the intermediate circulation passage 40, the bypass passage 41 and a part of the upstream circulation passage 40 (see FIG. 8).

Furthermore, a first temperature sensor 64 and a second temperature sensor 65 are arranged in the downstream circulation passage 40. The first temperature sensor 64 is constituted of, for example, a thermocouple, and is arranged in the vicinity of the air outlet port 40*b* of the downstream circulation passage 40. The first temperature sensor 64 is electrically connected to the controller 2, detects a temperature T1 in the vicinity of the air outlet port 40*b* (hereinafter referred to as "first temperature"), that is, the temperature inside the curing furnace 10, and outputs a detection signal representing the first temperature to the controller 2.

Besides, like the first temperature sensor 64, the second temperature sensor 65 is constituted of, for example, a thermocouple, and is arranged between the heater 30 and the connection portion between the downstream circulation passage 40 and the bypass passage 41. The second temperature sensor 65 is electrically connected to the controller 2, detects a temperature T2 in the downstream circulation passage 40 in the vicinity of the heater 30 (hereinafter referred to as "second temperature"), and outputs a detection signal representing the second temperature to the controller 2.

On the other hand, a work robot 70 is electrically connected to the controller 2. The work robot 70 is a robot arm type and includes a sensor, an actuator (neither of which is shown), and the like. During the execution of the resin curing control processing described later, the work robot 70 executes an operation of taking the workpiece W in and out of the curing furnace 10 through the opening 11*a* when the shutter 13 is opened (see FIG. 8).

During these operations, the work robot 70 outputs an operation signal representing its operation state to the controller 2. Accordingly, the controller 2 determines whether the workpiece W is accommodated in the curing furnace 10 or not and determines whether the work robot 70 has evacuated from the curing furnace 10 or not based on this operation signal.

In addition, the controller 2 is constituted of a microcomputer including a central processing unit (CPU), a random access memory (RAM), a read only memory (ROM), an input/output (I/O) interface (none of which is shown) and the like, and the resin curing control processing is executed as described below in response to the detection signals of the various sensors 60 to 65 and the operation signal of the work robot 70. Moreover, in the present embodiment, the controller 2 corresponds to the flow passage control device, the heater control device, the object determination unit, and the execution condition determination unit.

Next, the resin curing control processing is described with reference to FIGS. 3 to 6. As described below, the control processing controls the open/closed state of the shutter 13, the open/closed state of the three valves 51 to 53 and the heat generation state of the heater 30 so as to cure the liquid resin applied to the workpiece W, and is executed by the controller 2 in a predetermined control cycle. Moreover, the resin curing control processing is executed when first heater control processing at cold time in a temperature rise control processing at cold time described later has been executed.

In addition, the values of various flags in the following description are all reset to "0" at the start of operation of the resin curing device 1 (that is, when the power is turned on), and are stored in the RAM in the controller 2 during the execution of the resin curing control processing.

Figure 3:
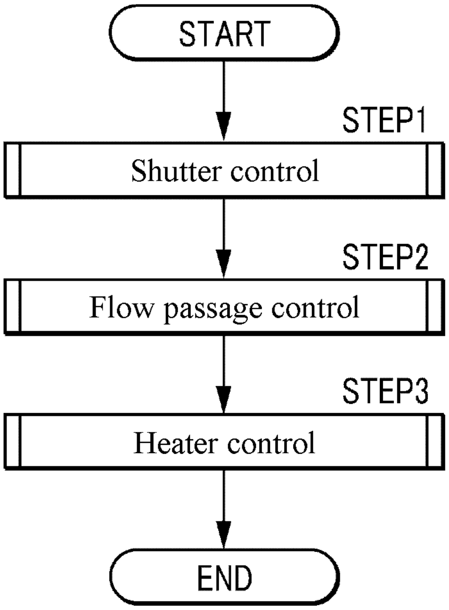
FIG. 3 is a flowchart showing resin curing control processing.

As shown in FIG. 3, in the resin curing control processing, first, the shutter control processing is executed (FIG. 3/STEP 1). The shutter control processing controls the open/closed state of the shutter 13 by driving the shutter motor 14, and is specifically executed as shown in FIG. 4.

Figure 4:
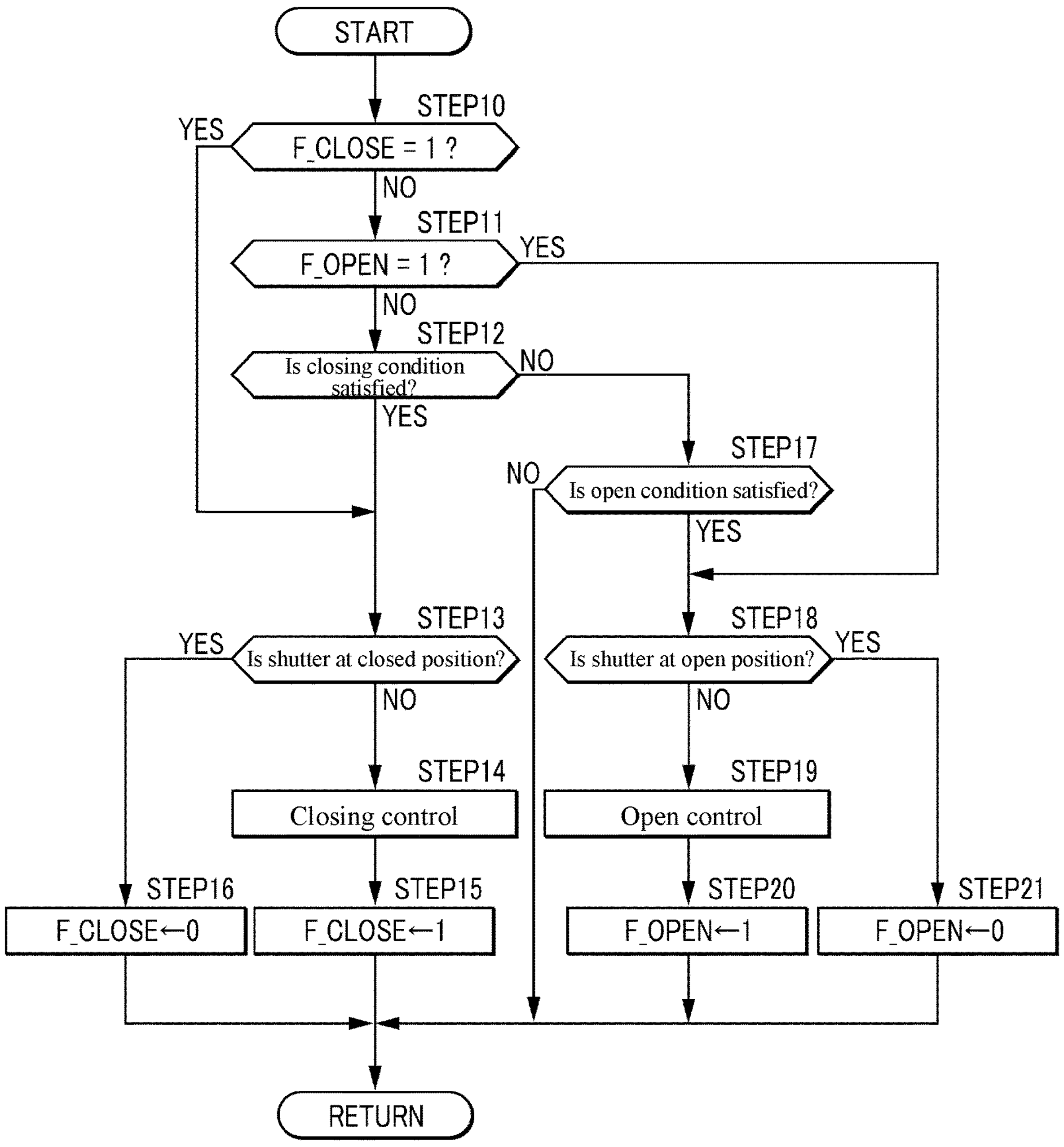
FIG. 4 is a flowchart showing shutter control processing.

As shown in FIG. 4, first, it is determined whether a closing control flag F_CLOSE is "1" or not (FIG. 4/STEP 10). The closing control flag F_CLOSE indicates whether a closing control processing described later is being executed or not. When this determination is affirmative (FIG. 4/STEP 10 . . . YES), that is, the closing control processing is being executed at the control timing before the previous time, the shutter control processing proceeds to STEP 13 described later.

On the other hand, when this determination is negative (FIG. 4/STEP 10 . . . NO), that is, the closing control processing is not being executed, it is determined whether an open control flag F_OPEN is "1" or not (FIG. 4/STEP 11). The open control flag F_OPEN indicates whether an open control processing described later is being executed or not.

When this determination is affirmative (FIG. 4/STEP 11 . . . YES), that is, the open control processing is being executed at the control timing before the previous time, the shutter control processing proceeds to STEP 18 described later. On the other hand, when this determination is negative (FIG. 4/STEP 11 . . . NO), that is, the opening control processing is not being executed, it is determined whether a closing condition is satisfied or not (FIG. 4/STEP 12).

The closing condition is an execution condition of the closing control processing described later. Specifically, it is determined that the closing condition is satisfied when all of the following conditions (f1) to (f3) are satisfied. Otherwise, it is determined that the closing condition is not satisfied.

(f1) The shutter 13 is at the open position.

(f2) The workpiece W is accommodated in the curing furnace 10.

(f3) The work robot 70 has evacuated from the curing furnace 10.

When this determination is affirmative (FIG. 4/STEP 12 . . . YES), that is, the closing condition is satisfied, or when the closing control processing is being executed at the control timing before the previous time, it is determined whether the shutter 13 is at the closed position or not based on the detection signal of the shutter sensor 60 (FIG. 4/STEP 13).

When this determination is negative (FIG. 4/STEP 13 . . . NO), that is, the shutter 13 is not at the closed position, the closing control processing is executed (FIG. 4/STEP 14). In the closing control processing, the shutter motor 14 is controlled so as to drive the shutter 13 toward the closing position side.

Then, the closing control flag F_CLOSE is set to "1" to indicate that the closing control processing is being executed (FIG. 4/STEP 15). After that, this processing is ended.

On the other hand, when the above determination is affirmative (FIG. 4/STEP 13 . . . YES), that is, the shutter 13 is at the closed position, it is determined that the execution of the closing control processing is not necessary, and the closing control flag F_CLOSE is set to "0" to indicate the determination (FIG. 4/STEP 16). After that, this processing is ended.

In addition, when the above determination is negative (FIG. 4/STEP 12 . . . NO), that is, the closing condition is not satisfied, it is determined whether an opening condition is satisfied or not (FIG. 4/STEP 17).

The opening condition is an execution condition of the opening control processing described later. Specifically, it is determined that the opening condition is satisfied when all of the following conditions (f4) to (f5) are satisfied. Otherwise, it is determined that the opening condition is not satisfied.

(f4) The shutter 13 is at the closed position.

(f5) The air flow passage is the bypass passage 41.

In this case, based on the detection signals of the three opening degree sensors 61 to 63 described above, when the opening degrees of the first circulation passage valve 51 and the second circulation passage valve 52 are both the fully closed values, and the opening degree of the bypass valve 53 is the fully open value, it is determined that the air flow passage is the bypass passage 41. Otherwise, it is determined that the air flow passage is not the bypass passage 41.

When this determination is negative (FIG. 4/STEP 17 . . . NO), that is, the opening condition is not satisfied, this processing is ended directly.

On the other hand, when this determination is affirmative (FIG. 4/STEP 17 . . . YES), that is, the open condition is satisfied, or when the open control processing is being executed at the control timing before the previous time, it is determined whether the shutter 13 is at the open position or not based on the detection signal of the shutter sensor 60 (FIG. 4/STEP 18).

When this determination is negative (FIG. 4/STEP 18 . . . NO), that is, the shutter 13 is not at the open position, the open control processing is executed (FIG. 4/STEP 19). In this open control processing, the shutter motor 14 is controlled so as to drive the shutter 13 toward the open position side.

Then, the open control flag F_OPEN is set to "1" to indicate that the open control processing is being executed (FIG. 4/STEP 20). After that, this processing is ended.

On the other hand, when the above determination is affirmative (FIG. 4/STEP 18 . . . YES), that is, the shutter 13 is at the open position, it is determined that the execution of the open control processing is not necessary, and the open control flag F_OPEN is set to "0" to indicate the determination (FIG. 4/STEP 21). After that, this processing is ended. Moreover, although not shown, the workpiece W is taken in and out of the curing furnace 10 by controlling the work robot 70 when the shutter 13 is at the open position.

Returning to FIG. 3, the flow passage control processing (FIG. 3/STEP 2) is executed after the shutter control processing (FIG. 3/STEP 1) is executed as described above. The flow passage control processing switches the air flow passage between the circulation passage 40 and the bypass passage 41 by controlling the opening degrees of the three valves 51 to 53 described above. Specifically, the flow passage control processing is executed as shown in FIG. 5.

Figure 5:
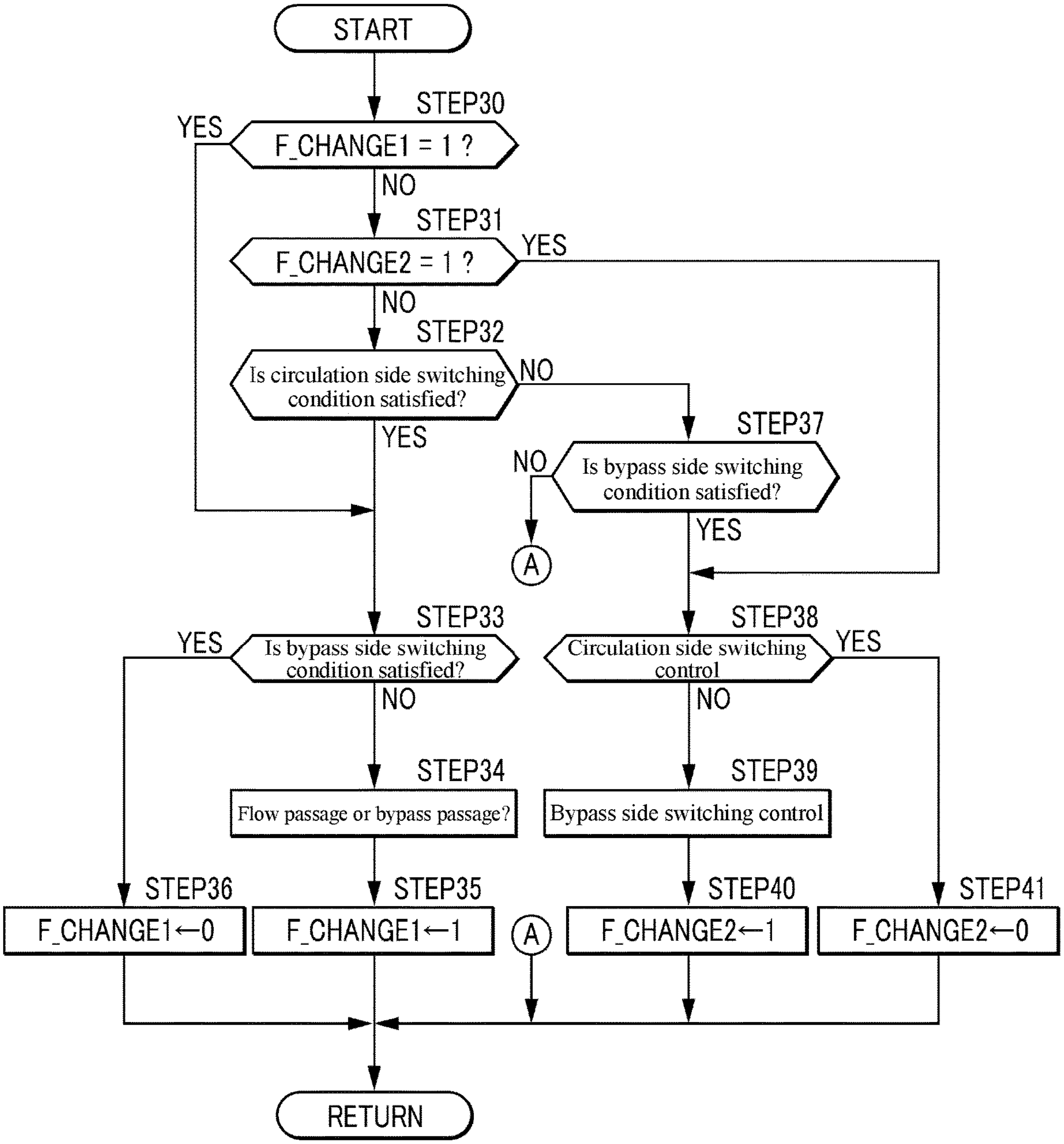
FIG. 5 is a flowchart showing flow passage control processing.

As shown in FIG. 5, first, it is determined whether a first switching control flag F_CHANGE1 is "1" or not (FIG. 5/STEP 30). The first switching control flag F_CHANGE1 indicates whether circulation side switching control processing described later is being executed or not. When this determination is affirmative (FIG. 5/STEP 30 . . . YES), that is, the circulation side switching control processing is being executed at the control timing before the previous time, the processing proceeds to STEP 33 described later.

On the other hand, when this determination is negative (FIG. 5/STEP 30 . . . NO), that is, the circulation side switching control processing is not being executed, it is determined whether a second switching control flag F_CHANGE2 is "1" or not (FIG. 31). The second switching control flag F_CHANGE2 indicates whether bypass side switching control processing described later is being executed or not.

When this determination is affirmative (FIG. 5/STEP 31 . . . YES), that is, the bypass side switching control processing is being executed at the control timing before the previous time, the flow passage control processing proceeds to STEP 38 described later. On the other hand, when this determination is negative (FIG. 5/STEP 31 . . . NO), that is, the bypass side switching control processing is not being executed, it is determined whether a circulation side switching condition is satisfied or not (FIG. 5/STEP 32).

The circulation side switching condition is an execution condition of the circulation side switching control processing for switching the air flow passage from the bypass passage 41 to the circulation passage 40 side. Specifically, it is determined that the circulation condition is satisfied when all of the following conditions (f6) to (f8) are satisfied. Otherwise, it is determined that the circulation condition is not satisfied.

(f6) The shutter 13 is at the closed position.

(f7) The workpiece W is accommodated in the curing furnace 10.

(f8) The air flow passage is the bypass passage 41.

When this determination is affirmative (FIG. 5/STEP 32 . . . YES), that is, the circulation side switching condition is satisfied, or when the circulation side switching control processing is being executed at the control timing before the previous time, it is determined whether the air flow passage is the circulation passage 40 or not based on the detection signals of the three opening degree sensors 61 to 63 described above (FIG. 33).

In this case, when the opening degrees of the first circulation passage valve 51 and the second circulation passage valve 52 are both the fully open values and the opening degree of the bypass valve 53 is the fully closed value, it is determined that the air flow passage is the circulation passage 40. Otherwise, it is determined that the air flow passage is not the circulation passage 40. Moreover, in the present embodiment, the determination of STEP 32 and STEP 33 corresponds to the determination of whether the execution condition of the operation of feeding the gas to the curing furnace is satisfied or not.

When this determination is negative (FIG. 5/STEP 33 . . . NO), that is, the air flow passage is not the circulation passage 40, it is determined that the air flow passage should be the circulation passage 40, and the circulation side switching control processing is executed (FIG. 5/STEP 34). In the circulation side switching control processing, the opening degrees of the first circulation passage valve 51 and the second circulation passage valve 52 are both controlled to be the fully open values, and the opening degree of the bypass valve 53 is controlled to be the fully closed value.

Then, the first switching control flag F_CHANGE1 is set to "1" to indicate that the circulation side switching control processing is being executed (FIG. 5/STEP 35). After that, this processing is ended.

On the other hand, when the above determination is affirmative (FIG. 5/STEP 33 . . . YES), that is, the air flow passage is the circulation passage 40, it is determined that the execution of the circulation side switching control processing is not necessary, and the first switching control flag F_CHANGE1 is set to "0" to indicate the determination (FIG. 5/STEP 36). After that, this processing is ended.

On the other hand, when the above determination is negative (FIG. 5/STEP 32 . . . NO), that is, the circulation side switching condition is not satisfied, it is determined whether a bypass side switching condition is satisfied or not (FIG. 5/STEP 37).

The bypass side switching condition is an execution condition of the bypass side switching control processing for switching the air flow passage from the circulation passage 40 to the bypass passage 41 side. Specifically, it is determined that the bypass side switching condition is satisfied when all of the following conditions (f9) to (f10) are satisfied or when a condition (f11) is satisfied. Otherwise, it is determined that the bypass side switching condition is not satisfied.

(f9) The air flow passage is the circulation passage 40.

(f10) A predetermined curing time has elapsed from the timing when the air flow passage is switched from the bypass passage 41 to the circulation passage 40 side.

(f11) The workpiece W is accommodated in the curing furnace 10 for the first time after the first heater control processing at cold time described later is executed.

The predetermined curing time is set to a time during which the liquid resin applied to the workpiece W is appropriately cured in the curing furnace 10.

When this determination is negative (FIG. 5/STEP 37 . . . NO), that is, the bypass side switching condition is not satisfied, this processing is ended directly. On the other hand, when this determination is affirmative (FIG. 5/STEP 37 . . . YES), that is, the bypass side switching condition is satisfied, or when the bypass side switching control processing is being executed at the control timing before the previous time, it is determined whether the air flow passage is the bypass passage 41 or not (FIG. 5/STEP 38). As described above, this determination is executed based on the detection signals of the three opening degree sensors 61 to 63.

When this determination is negative (FIG. 5/STEP 38 . . . NO), that is, the air flow passage is not the bypass passage 41, it is determined that the air flow passage should be the bypass passage 41, and the bypass side switching control processing is executed (FIG. 5/STEP 39). In the bypass side switching control processing, the opening degrees of the first circulation passage valve 51 and the second circulation passage valve 52 are both controlled to be the fully closed values, and the opening degree of the bypass valve 53 is controlled to be the fully open value.

Then, the second switching control flag F_CHANGE2 is set to "1" to indicate that the bypass side switching control processing is being executed (FIG. 5/STEP 40). After that, this processing is ended.

On the other hand, when the above determination is affirmative (FIG. 5/STEP 38 . . . YES), that is, the air flow passage is the bypass passage 41, it is determined that the execution of the bypass side switching control processing is not necessary, and the second switching control flag F_CHANGE2 is set to "0" to indicate the determination (FIG. 41). After that, this processing is ended.

Returning to FIG. 3, the heater control processing (FIG. 3/STEP 3) is executed after the flow passage control processing (FIG. 3/STEP 2) is executed as described above. The heater control processing controls the temperature of the air circulating in the circulation passage 40 or the bypass passage 41 by controlling the heat generation state of the heater 30 described above. Specifically, the heater control processing is executed as shown in FIG. 6.

Figure 6:
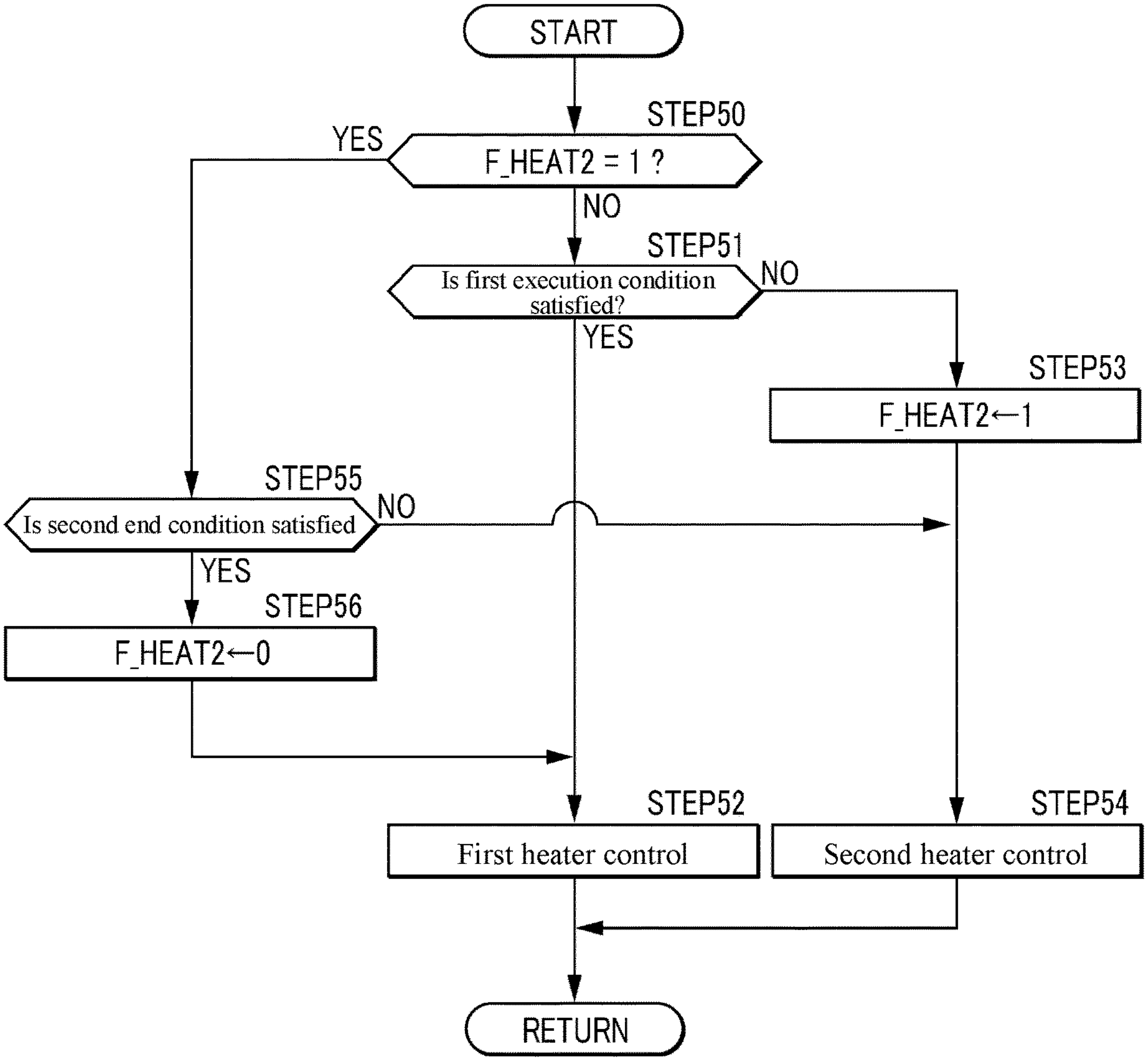
FIG. 6 is a flowchart showing heater control processing.

As shown in FIG. 6, first, it is determined whether a second heater control flag F_HEAT2 is "1" or not (FIG. 6/STEP 50). The second heater control flag F_HEAT2 indicates whether second heater control processing described later is being executed or not.

When this determination is negative (FIG. 6/STEP 50 . . . NO), that is, the second heater control processing is not executed at the control timing before the previous time, it is determined whether a first execution condition is satisfied or not (FIG. 6/STEP 51).

The first execution condition is an execution condition of first heater control processing described later. Specifically, it is determined that the first execution condition is satisfied when all of the following conditions (g1) to (g4) are satisfied. Otherwise, it is determined that the first execution condition is not satisfied.

(g1) The shutter 13 is at the closed position.

(g2) The workpiece W is accommodated in the curing furnace 10.

(g3) The air flow passage is the circulation passage 40.

(g4) The predetermined curing time described above has not elapsed from the timing when the air flow passage is switched from the bypass passage 41 to the circulation passage 40 side.

When this determination is affirmative (FIG. 6/STEP 51 . . . YES), that is, the first execution condition is satisfied, it is determined that the first heater control processing should be executed, and the first heater control processing is executed (FIG. 6/STEP 52).

In the first heater control processing, a proportional integral derivative (PID) control of the heater 30 is performed so that the first temperature T1 becomes a first target temperature Tcmd1. The first target temperature Tcmd1 is set to a temperature at which the liquid resin applied to the workpiece W is appropriately cured in the curing furnace After the first heater control processing is executed in this way, this processing is ended. Moreover, in the present embodiment, the first target temperature Tcmd1 corresponds to a predetermined curing temperature, and a predetermined curing temperature atmosphere is realized in the curing furnace 10 by controlling the first temperature T1 to the first target temperature Tcmd1.

On the other hand, when the above determination is negative (FIG. 6/STEP 51 . . . NO), that is, the first execution condition is not satisfied, it is determined that the second heater control processing should be executed, and the second heater control flag F_HEAT2 is set to "1" to indicate the determination (FIG. 6/STEP 53).

Then, the second heater control processing is executed (FIG. 6/STEP 54). In the second heater control processing, the PID control of the heater 30 is performed so that the second temperature T2 becomes a second target temperature Tcmd2. The second target temperature Tcmd2 is set to a value at which the second temperature T2 is controlled to a value lower than the heat resistant temperature Tmax of the duct during the execution of the second heater control processing, and set to a value (for example, 180° C.) at which the time required for the first temperature T1 to reach the value around the first target temperature Tcmd1 can be shortened when the second heater control processing is switched to the first heater control processing. After the second heater control processing is executed in this way, this processing is ended.

On the other hand, when the above determination is affirmative (FIG. 6/STEP 50 . . . YES), that is, the second heater control processing is executed at the control timing before the previous time, it is determined whether a second end condition is satisfied or not (FIG. 6/STEP 55).

The second end condition is an end condition of the second heater control processing. Specifically, it is determined that the second end condition is satisfied when all of the following conditions (g5) to (g7) are satisfied. Otherwise, it is determined that the second end condition is not satisfied.

(g5) The shutter 13 is at the closed position.

(g6) The workpiece W is accommodated in the curing furnace 10.

(g7) The air flow passage has been switched from the bypass passage 41 to the circulation passage 40 side.

When this determination is negative (FIG. 6/STEP 55 . . . NO), that is, the second end condition is not satisfied, the second heater control processing is executed as described above (FIG. 5/STEP 54). After that, this processing is ended.

On the other hand, when this determination is affirmative (FIG. 6/STEP 55 . . . YES), that is, the second end condition is satisfied, it is determined that the execution of the second heater control processing is not necessary, and the second heater control flag F_HEAT2 is set to "0" to indicate the determination (FIG. 6/STEP 56).

Then, the first heater control processing is executed as described above (FIG. 6/STEP 52). After that, this processing is ended.

Returning to FIG. 3, after the heater control processing (FIG. 3/STEP 3) is executed as described above, the resin curing control processing of FIG. 3 is ended.

Figure 7:
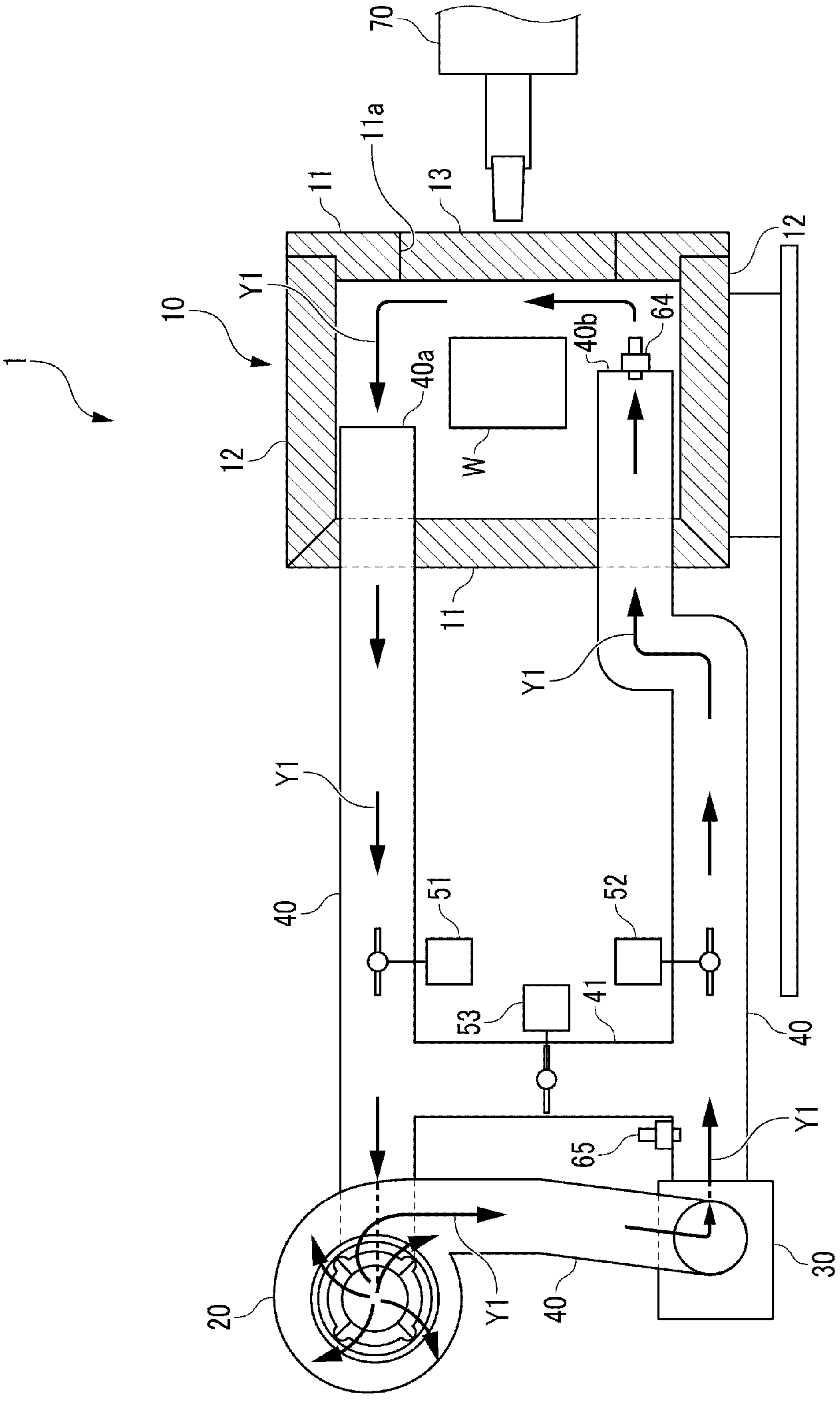
FIG. 7 is a diagram showing an air flow passage during a curing operation of a liquid resin.

In the resin curing device 1, the resin curing control processing is executed as described above, and thus when the curing operation of the liquid resin is executed while the workpiece W coated with the liquid resin is accommodated in the curing furnace 10, the air flow passage is set to the circulation passage 40 side as shown in FIG. 7 by the flow passage control processing of FIG. 5 described above. Accordingly, as shown by the arrow Y1 in FIG. 7, the air circulates among the curing furnace 10, the upstream circulation passage 40, the intermediate circulation passage 40, and the downstream circulation passage 40, and is heated by the heater 30 during the circulation. Consequently, the liquid resin is cured by supplying hot air to the curing furnace 10.

Figure 8:
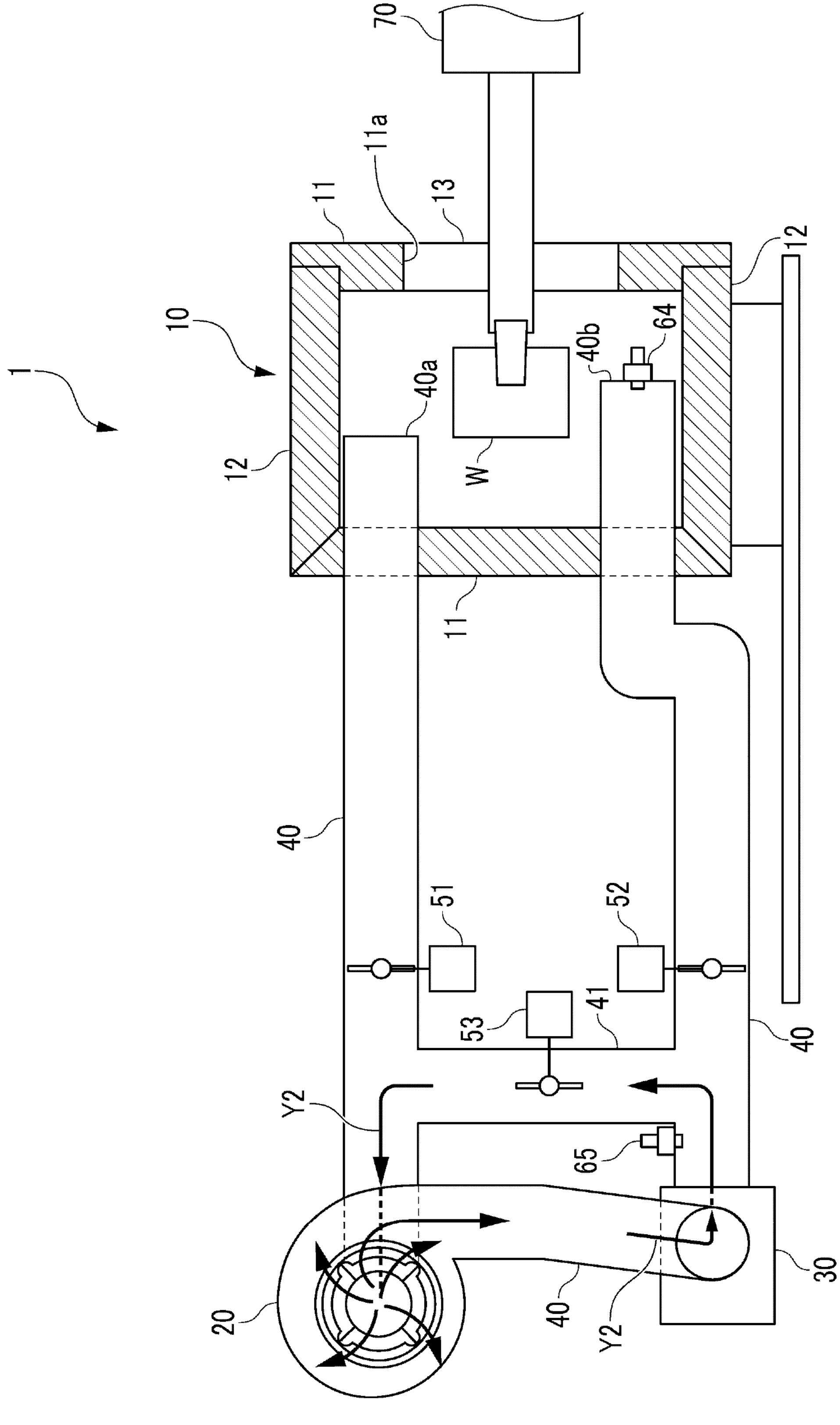
FIG. 8 is a diagram showing an air flow passage during an operation of taking a workpiece into or out of a curing furnace.

In addition, when the workpiece W is taken in and out of the curing furnace the air flow passage is set to the bypass passage 41 side as shown in FIG. 8 by the flow passage control processing described above. Accordingly, as shown by the arrow Y2 in FIG. 8, the air circulates among the intermediate circulation passage 40, a part of the downstream circulation passage 40, the bypass passage 41 and a part of the upstream circulation passage 40 while bypassing the curing furnace 10, and is heated by the heater during the circulation. Consequently, the workpiece W can be easily taken in and out of the curing furnace 10 by not supplying the hot air to the curing furnace 10. In addition, because the circulating air is kept heated by the heater 30, the vaporized varnish is prevented from liquefying and attaching to the heater 30 and the blower 20 or prevented from curing after it is attached.

Next, the temperature rise control processing at cold time is described with reference to FIG. 9. The temperature rise control processing at cold time is performed for raising the temperature of the air in the curing furnace 10 and the circulation passage 40 when the power of the resin curing device 1 is turned on. The temperature rise control processing at cold time is executed by the controller 2 in a predetermined control cycle.

Figure 9:
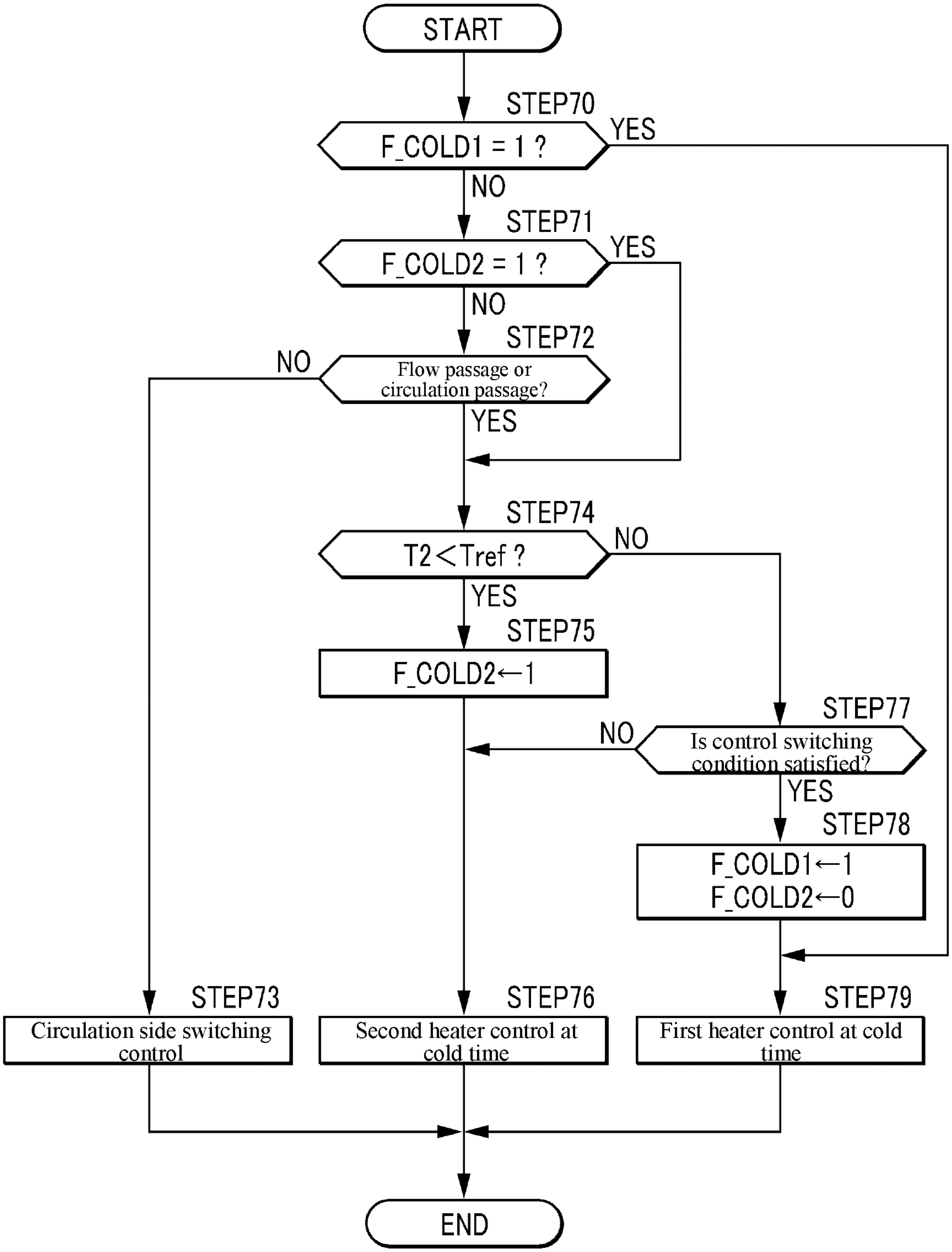
FIG. 9 is a flowchart showing temperature rise control processing at cold time.

As shown in FIG. 9, first, it is determined whether a first control flag at cold time F_COLD1 is "1" or not (FIG. 9/STEP 70). The first control flag at cold time F_COLD1 indicates whether the first heater control processing at cold time described later is being executed or not.

When this determination is affirmative (FIG. 9/STEP 70 . . . YES), that is, the first heater control processing at cold time is being executed at the control timing before the previous time, the temperature rise control processing at cold time proceeds to STEP 79 described later.

On the other hand, when this determination is negative (FIG. 9/STEP 70 . . . NO), that is, the first heater control processing at cold time is not being executed at the control timing before the previous time, it is determined whether a second control flag at cold time F_COLD2 is "1" or not (FIG. 9/STEP 71). The second temperature rise control flag at cold time F_COLD2 indicates whether the second heater control processing at cold time described later is being executed or not.

When this determination is affirmative (FIG. 9/STEP 71 . . . YES), that is, the second heater control processing at cold time is being executed at the control timing before the previous time, the processing proceeds to STEP 74 described later.

On the other hand, when this determination is negative (FIG. 9/STEP 71 . . . NO), that is, the second heater control processing at cold time is not being executed at the control timing before the previous time, it is determined whether the air flow passage is the circulation passage 40 or not (FIG. 9/STEP 72). This determination is executed in the same manner as in STEP 33 described above.

When this determination is negative (FIG. 9/STEP 72 . . . NO), that is, the air flow passage is not the circulation passage 40, it is determined that the air flow passage should be the circulation passage 40, and the circulation side switching control processing is executed (FIG. 9/STEP 73). The circulation side switching control processing is executed in the same manner as in STEP 34 described above. After that, this processing is ended.

On the other hand, when the above determination is affirmative (FIG. 9/STEP 72 . . . YES), that is, the air flow passage is the circulation passage 40, or when the second heater control processing at cold time is being executed at the control timing before the previous time (FIG. 9/STEP 71 . . . YES), it is determined whether the second temperature T2 is lower than a predetermined temperature Tref (for example, 180° C.) or not (FIG. 9/STEP 74).

When this determination is affirmative (FIG. 9/STEP 74 . . . YES), that is, T2<Tref is satisfied, it is determined that the second heater control processing at cold time should be executed, and the second control flag at cold time F_COLD2 is set to "1" to indicate the determination (FIG. 9/STEP 75).

Then, the second heater control processing at cold time is executed (FIG. 9/STEP 76). In the second heater control processing at cold time, the PID control of the heater 30 is performed so that the second temperature T2 becomes a predetermined warm-up temperature Tref2. The predetermined warm-up temperature Tref2 is set to a value at which Tref2>Tref is satisfied and the second temperature T2 does not exceed the heat resistant temperature Tmax of the duct during the execution of the second heater control processing at cold time. After the second heater control processing at cold time is executed in this way, this processing is ended.

On the other hand, when the above determination is negative (FIG. 9/STEP 74 . . . NO), that is, T2≥Tref is satisfied, it is determined whether a control switching condition is satisfied or not (FIG. 9/STEP 77). The control switching condition is a condition of switching from the second heater control processing at cold time to the first heater control processing at cold time. It is determined that the control switching condition is satisfied when the following condition (h1) is satisfied. Otherwise, it is determined that the control switching condition is not satisfied.

(h1) The time during which T2≥Tref is satisfied has continued for a predetermined time tm_ref (for example, several seconds to several tens of seconds) or more.

The condition (h1) is a condition for avoiding control hunting, and in the present embodiment, the condition (h1) corresponds to a predetermined condition.

When this determination is negative (FIG. 9/STEP 77 . . . NO), that is, the control switching condition is not satisfied, the second heater control processing at cold time (FIG. 9/STEP 76) is executed as described above, and then this processing is ended.

On the other hand, when this determination is affirmative (FIG. 9/STEP 77 . . . YES), that is, the control switching condition is satisfied, it is determined that the switching from the second heater control processing at cold time to the first heater control processing at cold time should be executed, and the first control flag at cold time F_COLD1 is set to "1" and the second control flag at cold time F_COLD2 is set to "0" to indicate the determination (FIG. 9/STEP 78).

As described above, when the first control flag at cold time F_COLD1 is set to "1", or when the first heater control processing at cold time is being executed at the control timing before the previous time (FIG. 9/STEP 70 . . . YES), the first heater control processing at cold time is executed (FIG. 9/STEP 79). In the first heater control processing at cold time, the PID control of the heater 30 is performed so that the first temperature T1 becomes the first target temperature Tcmd1. After the first heater control processing at cold time is executed in this way, this processing is ended.

Figure 10:
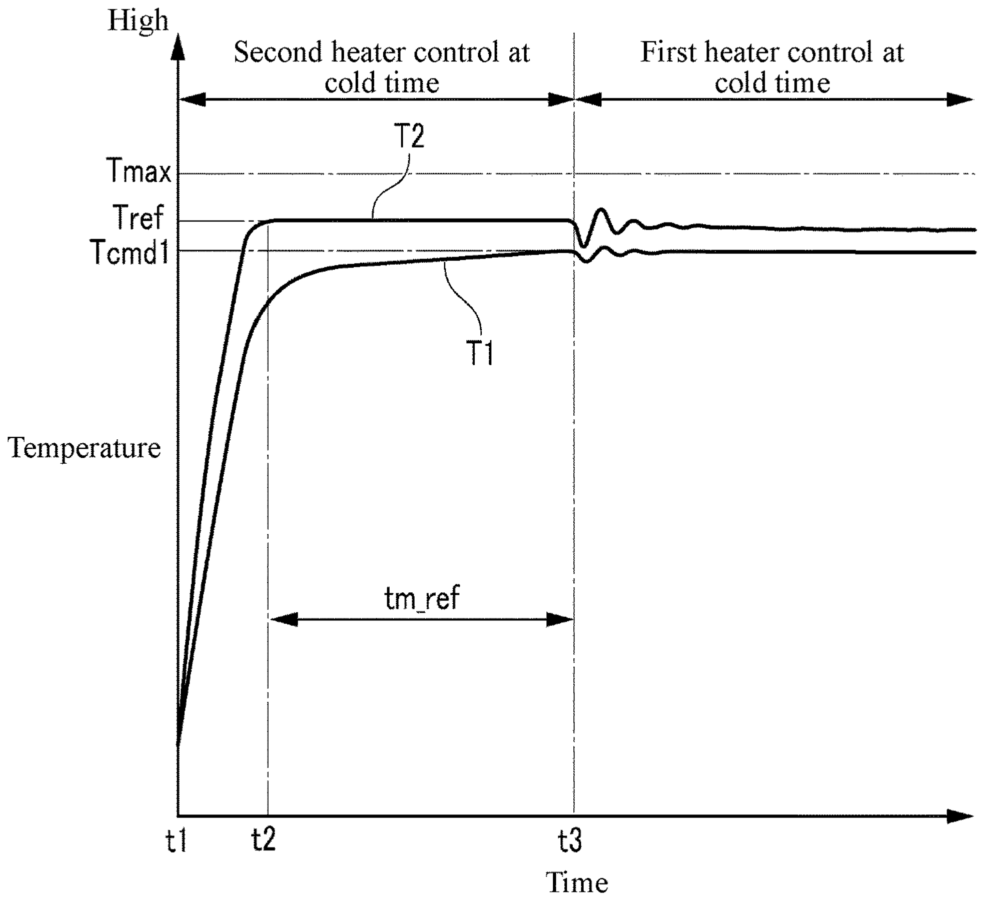
FIG. 10 is a timing chart showing transition in a first temperature and a second temperature when the temperature rise control processing at cold time is executed.

Next, the control result during the execution of the temperature rise control processing at cold time described above is described with reference to FIG. 10 and FIG. 11. FIG. 10 shows an example of the control result in the case of the execution of the temperature rise control processing at cold time of FIG. 9, and FIG. 11 shows an example of the control result in the case of the execution of the first heater control processing at cold time from the start of control for comparison (hereinafter referred to as "comparative example").

Figure 11:
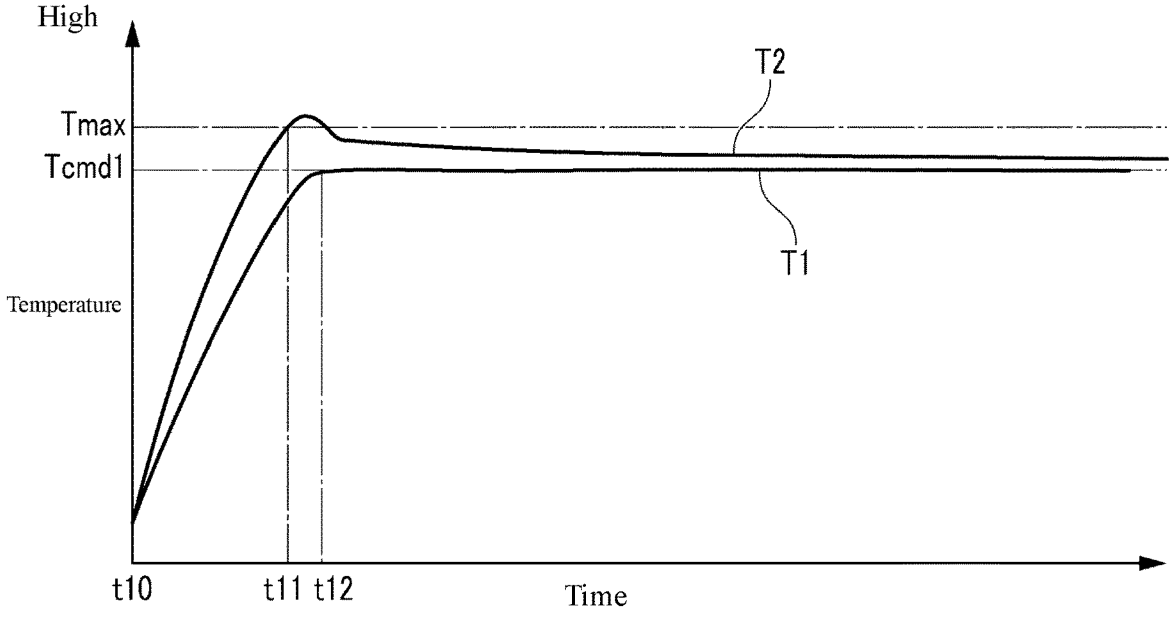
FIG. 11 is a timing chart showing transition in the first temperature and the second temperature when first heater control processing at cold time is executed from the beginning.

First, as shown in FIG. 11, when the first heater control processing at cold time is executed from the start time point of the control (time t10), the second temperature T2 overshoots the heat resistant temperature Tmax of the duct at a time point (time t11) earlier than a time point (time t12) at which the first temperature T1 reaches the first target temperature Tcmd1. Accordingly, the service life of the duct may be shortened.

In contrast, as shown in FIG. 10, when the temperature rise control processing at cold time of the present embodiment is executed, the temperature of the air in the circulation passage 40 is low at the start time point (time t1) of the control processing, and when T2<Tref is satisfied, the second heater control processing at cold time is executed. That is, the PID control of the heater 30 is performed so that the second temperature T2 becomes the predetermined warm-up temperature Tref2.

Then, with the elapse of time, the control processing of the heater 30 is switched from the second heater control processing at cold time to the first heater control processing at cold time by satisfying the control switching condition at a time point (time t3) when the predetermined time tm_ref has elapsed from the time point (time t2) when T2≥Tref is satisfied. Due to the switching of the control processing, the first temperature T1 and the second temperature T2 become temporarily unstable after the time t3, but the second temperature T2 is maintained so as not to exceed the heat resistant temperature Tmax of the duct. That is, in the temperature rise control processing at cold time of the present embodiment, unlike the comparative example, both the first temperature T1 and the second temperature T2 are maintained so as not to exceed the heat resistant temperature Tmax of the duct.

As described above, according to the resin curing device 1 of the present embodiment, the resin curing control processing shown in FIG. 3 and the temperature rise control processing at cold time shown in FIG. 9 are executed. In the heater control processing of the resin curing control processing, the first heater control processing is executed when the first execution condition is satisfied. In this case, when all of the above-mentioned conditions (g1) to (g4) are satisfied, that is, when the shutter 13 is at the closed position, the workpiece W is accommodated in the curing furnace 10, the air flow passage is the circulation passage 40, and the predetermined curing time has not elapsed from the timing when the air flow passage is switched from the bypass passage 41 to the circulation passage 40 side, it is determined that the first execution condition is satisfied.

Then, in the first heater control processing, the PID control of the heater 30 is performed so that the first temperature T1 becomes the first target temperature Tcmd1, and as described above, the first target temperature Tcmd1 is set to a temperature at which the liquid resin applied to the workpiece W is appropriately cured in the curing furnace 10. Therefore, the air heated to a temperature around the first target temperature Tcmd1 by the heater 30 can be circulated among the blower 20, the heater 30, and the curing furnace 10 via the circulation passage 40 until the predetermined curing time elapses, and the liquid resin applied to the workpiece W can be appropriately cured.

On the other hand, when the first execution condition is not satisfied, the second heater control processing is executed. The first execution condition is not satisfied when at least one of the above-mentioned conditions (g1) to (g4) is not satisfied. When the conditions (g1) to (g4) are not satisfied, the air flow passage is controlled to the bypass passage 41 in the flow passage control processing described above.

In addition, in the second heater control processing, the PID control of the heater 30 is performed so that the second temperature T2 becomes the second target temperature Tcmd2. As described above, the second target temperature Tcmd2 is set to a value at which the second temperature T2 is controlled to a value lower than the heat resistant temperature Tmax of the duct during the execution of the second heater control processing, and set to a value at which the time required for the first temperature T1 to reach the value around the first target temperature Tcmd1 can be shortened when the second heater control processing is switched to the first heater control processing.

Therefore, during the execution of the operation of taking the workpiece W in and out of the curing furnace 10, the air heated by the heater 30 can be circulated between the blower 20 and the heater 30 via the bypass passage 41 without circulating to the curing furnace 10 side. Accordingly, unlike before, it is not necessary to lower the temperature of the heater 30 until the next workpiece W is accommodated in the curing furnace 10, and the air heated by the heater 30 can be quickly fed into the curing furnace 10 when the air flow passage is switched from the bypass passage 41 to the circulation passage 40.

As a result, the time required to raise the temperature in the curing furnace 10 to an appropriate temperature again can be shortened as compared with before, and the work efficiency during curing of the liquid resin can be improved. In addition, as described above, while the air circulates between the blower 20 and the heater 30 via the bypass passage 41, the second temperature T2 is controlled to a value lower than the heat resistant temperature Tmax of the duct, and the air temperature can thereby be prevented from exceeding the heat resistant temperature Tmax of the duct, and the service life of the duct can be extended.

Furthermore, the decrease in the temperature of the heater 30 and the temperature of the air can be prevented during the execution of the operation of taking the workpiece W in and out of the curing furnace 10. Therefore, unlike before, the vaporized varnish can be prevented from liquefying and attaching to the heater 30 and the blower 20 or prevented from curing after it is attached.

In addition to this, during the execution of the resin curing control processing, the blower 20 circulates the air heated by the heater 30 among the heater 30, the curing furnace 10 and the blower 20 via the circulation passage 40, thus enabling the air having a uniform temperature and high wind speed to be supplied into the curing furnace 10. Accordingly, the raising rate of temperature in the curing furnace 10 can be increased and the curing time of the resin can be shortened as compared with the conventional batch type resin curing method.

Besides, in the case of the resin curing device 1 of the present embodiment, when the heater 30 is controlled based on the first temperature T1 under a condition that the air temperature in the circulation passage 40 is low, it takes time for the air heated by the heater 30 to reach the curing furnace 10 via the circulation passage 40 due to structural reasons. As a result, as shown in FIG. 11, the second temperature T2 may exceed the heat resistant temperature Tmax of the circulation passage 40 earlier than the first temperature T1.

In contrast, in the temperature rise control processing at cold time, when the second temperature T2 is lower than the predetermined temperature Tref, the second heater control processing at cold time is executed, and in the second heater control processing at cold time, the PID control of the heater 30 is performed so that the second temperature T2 becomes the predetermined warm-up temperature Tref2. The predetermined warm-up temperature Tref2 is set to a value at which the second temperature T2 does not exceed the heat resistant temperature Tmax of the duct during the execution of the second heater control processing at cold time. Therefore, the second temperature T2 can be prevented from exceeding the heat resistant temperature Tmax of the duct, and the service life of the duct of the circulation passage 40 can be extended.

Furthermore, during the execution of the second heater control processing at cold time, when the time during which T2≥Tref is satisfied has continued for the predetermined time tm_ref or more, the first heater control processing at cold time is executed. In the first heater control processing at cold time, the PID control of the heater is performed so that the first temperature T1 becomes the first target temperature Tcmd1. Therefore, the temperature inside the curing furnace 10 can be controlled to the optimum temperature for curing the liquid resin.

Moreover, in the embodiment, air is used as the gas. Alternatively, a non-flammable gas such as nitrogen or argon may also be used.

In addition, in the embodiment, the first target temperature Tcmd1 is used as the predetermined curing temperature, but the predetermined curing temperature of the disclosure is not limited thereto and may be any temperature at which the liquid resin attached to the object can be appropriately cured. That is, the predetermined curing temperature may be set according to the characteristics of the liquid resin.

On the other hand, in the embodiment, a turbofan type blower is used as the blower, but the blower of the disclosure is not limited thereto and may be any blower capable of blowing gas. For example, an axial flow blower and a positive displacement blower may be used as the blower.

Furthermore, in the embodiment, the first circulation passage valve 51, the second circulation passage valve 52, and the bypass valve 53 are used as the flow passage switching device, but the flow passage switching device of the disclosure is not limited thereto and may be any flow passage switching device capable of switching the gas flow passage between the circulation passage and the bypass passage. For example, an electric three-way valve may be used as the flow passage switching device, and in that case, the electric three-way valve may be arranged at the connection portion between the downstream circulation passage 40 and the bypass passage 41.

On the other hand, in the embodiment, the controller 2 is used as the flow passage control device, but the flow passage control device of the disclosure is not limited thereto and may be any flow passage control device capable of controlling the flow passage switching device. For example, a notebook-type personal computer or the like may be used as the flow passage control device.

In addition, in the embodiment, the controller 2 is used as the heater control device, but the heater control device of the disclosure is not limited thereto and may be any heater control device that controls the heater. For example, a notebook-type personal computer or the like may be used as the heater control device.

Furthermore, in the embodiment, the condition (h1) is used as the predetermined condition. Alternatively, the predetermined condition may be that the integrated value of the time during which the second temperature T2 is within the range of the predetermined temperature Tref or more has reached a predetermined value.

On the other hand, in the embodiment, the shutter 13 is used as the opening/closing device, but the opening/closing device of the disclosure is not limited thereto and may be any opening/closing device that opens/closes the opening of the curing furnace. For example, a rotary door type opening/closing device may be used as the opening/closing device.

Besides, in the embodiment, the presence/absence of the workpiece W in the curing furnace 10 is determined based on the operation signal from the work robot 70. Alternatively, the presence/absence of the workpiece W in the curing furnace 10 may be determined based on the signal of a detection device (for example, a sensor or a switch) arranged in the curing furnace 10, or may be determined by image recognition based on the signal of an imaging device such as a camera.

Furthermore, in the embodiment, the determination methods of STEPS 32 and 33 are used for determining whether the execution condition of the operation of feeding the gas to the curing furnace is satisfied or not, but the method of determining whether or not the execution condition is satisfied is not limited thereto and may be a method of determining whether the following condition is satisfied: the object is determined to be accommodated in the curing furnace and the opening of the curing furnace is closed by the opening/closing device. For example, in STEP 32, when all of the conditions (f6) to (f7) are satisfied and the determination in STEP 33 is affirmative, it may be determined that the execution condition of the operation of feeding the gas to the curing furnace is satisfied.

On the other hand, in the embodiment, it is determined that the liquid resin is cured when the predetermined curing time has elapsed from the timing when the air flow passage is switched from the bypass passage 41 to the circulation passage 40 side. Alternatively, the curing of the liquid resin may be determined by a method of recognizing an image captured by a camera.

In addition, in the embodiment, the first temperature sensor 64 arranged in the vicinity of the air outlet port 40*b* of the downstream circulation passage 40 is used as the first temperature sensor, but the first temperature sensor of the disclosure is not limited thereto and may be any temperature sensor that detects the temperature inside the curing furnace. For example, a temperature sensor arranged at a position other than the vicinity of the air outlet port 40*b* in the curing furnace 10 may be used as the first temperature sensor.

What is claimed is:

1. A resin curing device for curing a liquid resin attached to an object in a predetermined curing temperature atmosphere, the resin curing device comprising:

a heater for heating gas;

a curing furnace that allows the object to be taken in and out of the furnace via an opening;

a blower for blowing the gas;

a circulation passage extending among the blower, the heater, and the curing furnace so as to allow the gas to circulate among the blower, the heater, and the curing furnace;

a bypass passage connected to the circulation passage so as to bypass the curing furnace;

a plurality of valves capable of switching the gas flow passage between the circulation passage and the bypass passage; and a flow passage controller that is configured to control the plurality of valves so that the gas flow passage becomes the circulation passage when an execution condition of an operation of feeding the gas to the curing furnace is satisfied, and to control the plurality of valves so that the gas flow passage becomes the bypass passage when the execution condition is not satisfied, wherein each of the valves is independently controlled by the flow passage controller.

2. The resin curing device according to claim 1, further comprising:

a first temperature sensor for detecting a first temperature being the temperature inside the curing furnace;

a second temperature sensor for detecting a second temperature being the temperature inside the circulation passage on the downstream side of the heater and between the heater and the bypass passage; and a heater controller configured to control the heater based on the first temperature when the gas flow passage is the circulation passage, and to control the heater based on the second temperature when the gas flow passage is the bypass passage.

3. The resin curing device according to claim 2, wherein when the gas flow passage is the circulation passage, the heater controller controls the heater based on the second temperature when the second temperature is lower than a predetermined temperature, and controls the heater based on the first temperature after a predetermined condition including that the second temperature has reached the predetermined temperature is satisfied.

4. The resin curing device according to claim 1, wherein the resin curing device further comprises a shutter for opening/closing the opening of the curing furnace, and the flow passage controller comprises:

an object determination unit for determining whether the object is accommodated in the curing furnace or not; and an execution condition determination unit that determines that the execution condition is satisfied when the following condition is satisfied: the object determination unit determines that the object is accommodated in the curing furnace, and the opening of the curing furnace is closed by the shutter.

5. The resin curing device according to claim 2, wherein the resin curing device further comprises a shutter for opening/closing the opening of the curing furnace, and the flow passage controller comprises:

an object determination unit for determining whether the object is accommodated in the curing furnace or not; and an execution condition determination unit that determines that the execution condition is satisfied when the following condition is satisfied: the object determination unit determines that the object is accommodated in the curing furnace, and the opening of the curing furnace is closed by the shutter.

* * * * *